United States Patent [19]
Bykhovsky et al.

[11] 3,944,778
[45] Mar. 16, 1976

[54] ELECTRODE ASSEMBLY OF PLASMATRON

[76] Inventors: David Grigorievich Bykhovsky, Konjushenny pereulok 1/6, kv. 18; Aldexandr Ivanovich Danilov, V.O. 16 Linia, 79, kv. 15; Mikhail Shikovich Brodsky, ulitsa Ordzhonikidze, 10, kv. 27, all of Leningrad, U.S.S.R.

[22] Filed: May 14, 1974

[21] Appl. No.: 469,752

[52] U.S. Cl. ............... 219/121 P; 219/145; 219/75; 313/357
[51] Int. Cl.² ........................................... B23K 5/00
[58] Field of Search .......... 219/121 P, 75, 145, 137; 313/352, 353, 356

[56] References Cited
UNITED STATES PATENTS

| | | | |
|---|---|---|---|
| 2,922,028 | 1/1960 | Butler et al. | 219/145 |
| 3,089,983 | 5/1963 | Hapancourt et al. | 219/121 P X |
| 3,198,932 | 8/1965 | Weatherly | 219/145 |
| 3,272,962 | 9/1966 | Mauskapf | 219/121 P X |
| 3,375,392 | 3/1968 | Brzozowski et al. | 219/121 P X |
| 3,408,518 | 10/1968 | Strupczewski | 219/121 P X |
| 3,546,422 | 12/1970 | Bykhovsky et al. | 219/121 P |
| 3,780,259 | 12/1973 | Meyer | 219/145 |

*Primary Examiner*—J. V. Truhe
*Assistant Examiner*—G. R. Peterson
*Attorney, Agent, or Firm*—Haseltine, Lake & Waters

[57] ABSTRACT

An electrode assembly for a plasmatron, comprising a holder being cooled having a high-heat insert mounted therein in contact with a near-the-electrode zone of an arc at one side thereof and in thermal and electrical contact with the cooled holder at the other side thereof; a chamber formed in said holder between said high-heat insert and cooled holder extending symmetrical to the insert axis and filled with a substance whose coefficient of thermal conductivity is lower than that of the material of the cooled holder, the substance filling the chamber being in constant contact with the high-heat insert.

Used as a substance filling the chamber is a gaseous element, and as a high-heat insert is a metal selected from groups IV, V, or VI of the Periodic System, or an alloy based thereon.

7 Claims, 4 Drawing Figures

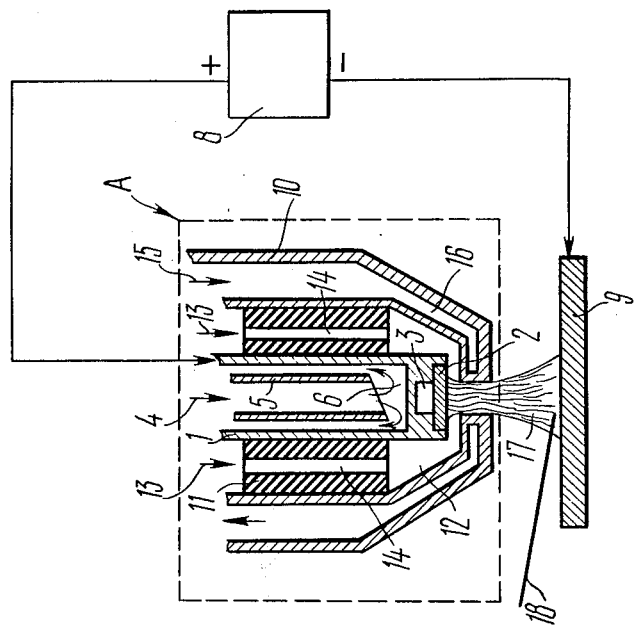
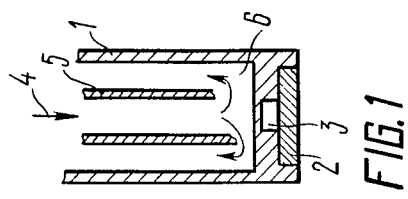
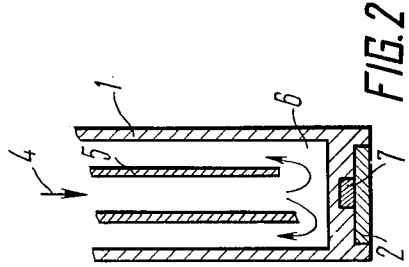

ELECTRODE ASSEMBLY OF PLASMATRON

The present invention relates to the sphere of processing materials by an electric, predominantly plasma arc and, more particularly, to electrode assemblies for a plasmatron.

An electrode assembly of the proposed invention may be used in plasmatrons for the welding, surfacing, surface finishing and cutting of metals.

Known in the art is an electrode assembly for a plasmatron which is designed as a metal holder subjected to cooling, and is made of a material having a high thermal conductivity, a high-heat insert being arranged and supported in the holder as an arc-forming portion of the electrode assembly for the plasmatron (U.S. Pat. No. 3,198,932).

A disadvantage of the known electrode assembly of a plasmatron lies in the limited load being allowed on the electrode assembly due to stepped-up migration in the zone proximate the arc, which heavily and adversely affects the dependability of the plasmatron electrode assembly during operation and causes deterioration of the surface finish of the materials.

Stepped up migration in the zone proximate the arc is caused by uniform heating of the effective area of the high-heat insert, as a result of which the zone of the arc proximate the electrode migrates throughout the surface area of the high-heat insert.

The primary object of the invention is to provide an electrode assembly for a plasmatron in which the central portion of the effective area of a high-heat insert is overheated.

The objects of the invention are effectuated in that in an electrode assembly for a plasmatron, constructed as a holder subjected to cooling, including a high-heat insert having one face thereof in contact with a near-the-electrode zone of the arc and another face being in thermal and electrical contact with the cooled holder wherein, according to the invention, a chamber is formed in the holder between the high-heat insert and the holder being cooled, the chamber being substantially symmetrical to the insert axis and filled with a substance whose coefficient of thermal conductivity is lower than that of the material from which said holder is made, the substance filling the chamber being in constant contact with the insert.

It is advantageous that the chamber be made air-tight and filled with a gaseous or solid substance, and that metals selected from a series of high-heat metals selected from the groups IV, V and VI of the Periodic System and alloys thereof be used as the high-heat inserts. As the inner space of the proposed electrode assembly of a plasmatron is filled with a substance (titanium, austenitic steel, air, argon, etc.) whose coefficient of thermal conductivity is lower than that of the material of the holder which is being cooled, heat transfer from the central portion of the effective area of the high-heat insert is less than the transfer of heat from the peripheral portions of the effective area of the high-heat insert, so as to cause the overheating of the central portion of said effective area of the insert as compared with the peripheral portions thereof and to result in a resultant limited migration of the arc.

In order to restrict the migration of the near-the-electrode zone of the arc when using a nonconsumable electrode without overheating the central portion of the effective area of the high-heat insert, it is necessary to provide for auxiliary measures which will help in localizing the near-the-electrode zone of the arc, e.g., a sharp rise in the supply of a gas which stabilizes the arc in case of plasma welding. This, however, results in adversely affecting the welding operation and, upon occasion, making the operation completely impossible.

At the same time, when using a nonconsumable electrode with the overheating of the central portion of the effective area of the high-heat insert, localization of the near-the-electrode zone of the arc is practicable without auxiliary measures, which permits plasma welding at a limited gas consumption.

Hereinbelow, the invention will become more readily apparent from the description of its exemplary embodiment having reference to the appended drawings, wherein:

FIG. 1 is an electrode assembly for a plasmatron with a chamber filled with gas constructed according to the invention;

FIG. 2 is an electrode assembly for a plasmatron with a chamber filled with a solid substance;

FIG. 3 is a design of a plasmatron with an electrode assembly constructed according to the invention.

Figure 4:
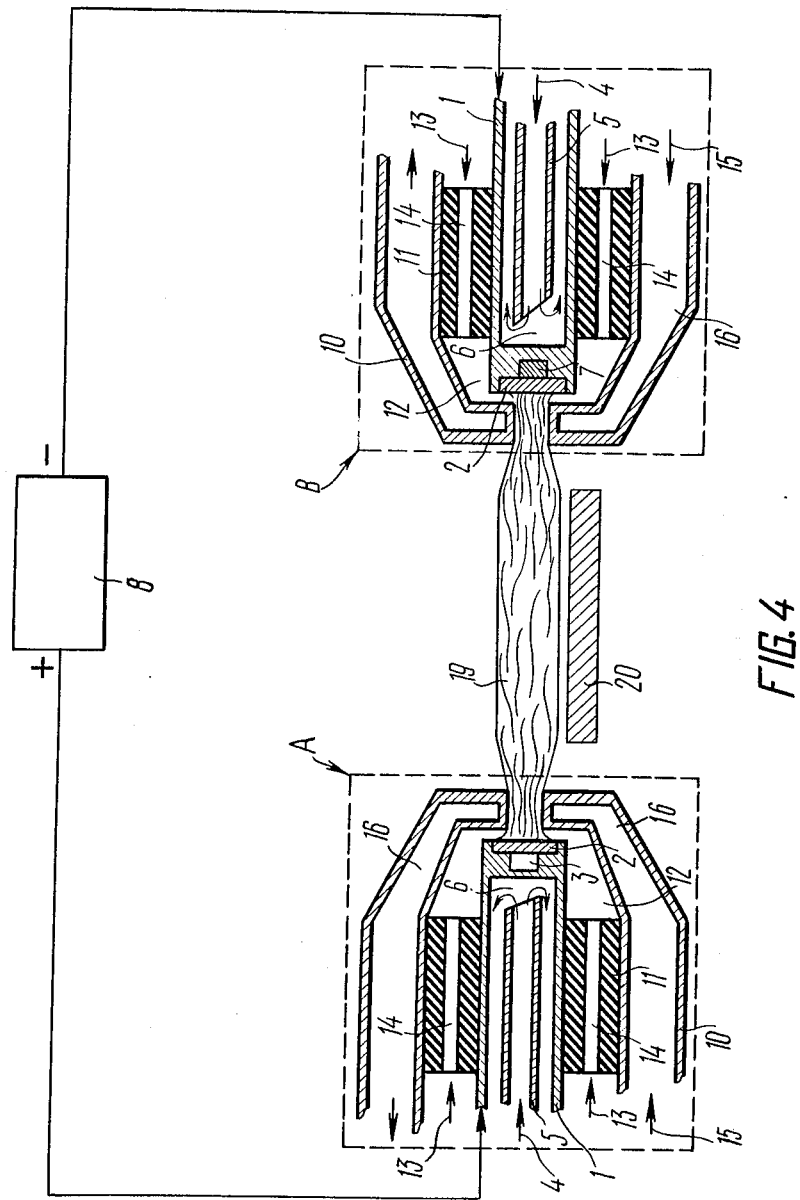
FIG. 4 is a device for the surface finishing of metals, consisting of two plasmatrons, provision being made for an electrode assembly in each plasmatron.

In making electrode assemblies, for effecting arc stabilization it is necessary that the central portion of the effective area of the high-heat insert be overheated. In this case, the near-the-electrode zone of the arc will be on the overhead portion of the effective area of the high-heat insert.

For ensuring the overheating of the central portion of the effective area of the high-heat insert, an electrode assembly is proposed (FIG. 1) to be made as a holder 1 which is being cooled, with an arc-forming high-heat insert 2 mounted therein and prepared from a high-heat metal, e.g., tantalum, tungsten, hafnium, and other high-heat metals selected from a row of high-heat metals of groups IV, V and VI of the Periodic System, or an alloy based thereon, e.g., their compositions taken in the following percentage ratios:

| Example 1 | Example 2 | Example 3 |
| --- | --- | --- |
| Ta — 73% | Hf — 99% | W — 97% |
| Hf — 25% | MO — 1% | La — 3% |
| Mo — 2% | | |

The high-heat insert 2 is in thermal and electrical contact with the cooled holder 1, whose material may be any electrically conductive material having a high coefficient of thermal conductivity, e.g., copper. Located in the holder between the high-heat insert 2 and the interior of the holder 1 being cooled so as to be symmetrical to the axis of the insert 2, is an air-tight chamber 3 which is filled with gas (air, argon). A cooling agent 4 fed through a pipe 5 circulates through an inner space 6 in the cooled holder 1, thus ensuring cooling of the high-heat insert 2.

Since the coefficient of thermal conductivity of the material filling the air-tight chamber 3 is selected to be lower than that of the material of the cooled holder 1, heat transfer from the peripheral portions of the high-heat insert 2 will be greater than the transfer of heat from the central portion thereof, which will cause the overheating of the central portion of the high-heat insert 2 and the localizing of the near-the-electrode zone of the arc.

Used in the electrode assembly of FIG. 2 as a material filling a chamber 7 provided in the holder between the interior of the cooled holder 1 and the high-heat insert 2, may be any solid substance e.g., titanium, steel, or pig iron of any composition in lieu of the gas. Whether the chamber 7 is filled with gas or solid substance, the operation of the electrode assembly is essentially same.

Electrode assemblies of the inventive design can be applied to devices used for welding or surfacing electrically conductive materials, as well as for the surface processing of any materials.

Described hereinbelow is an exemplary embodiment of a device for welding or surfacing electrically conductive materials with the use of an electrode assembly whose air-tight chamber is filled with gas (FIG. 3). Such device comprises a DC power source 8, whose positive pole is connected to the cooled holder 1 of a plasmatron A, while the negative pole thereof is connected to a material 9 which is being treated.

The electrode assembly for the plasmatron A, which is constructed of the cooled holder 1 and the high-heat insert 2, having chamber 3 between the holder interior and the high-heat insert filled with an element possessing a low coefficient of thermal conductivity, is enveloped by a water-cooled nozzle 10 of the plasmatron A and isolated therefrom by an insulator 11 so that a further space 12 is formed between the electrode assembly and the nozzle 10, into which there is fed, through a channel 14 in the insulator 11, a plasma-forming gas 13.

The nozzle 10 is made hollow so that a cooling agent 15 can be fed into a space 16 formed therein.

The operation of such a device is described in the following: The electrode assembly is connected to a positive pole of the DC source 8, whose negative pole is connected to the workpiece 9 which is being treated. Supplied into the chamber 6 of the cooled holder 1 through the pipe 5 is the cooling agent 4, and supplied into the space 16 of the nozzle 10 is the cooling agent 15. Simultaneously, the plasma-forming gas 13 is fed into the space 12 through the channel 14 for striking an arc 17 between the high-heat insert 2 of the electrode assembly and the workpiece 9.

Due to the provision in the electrode assembly of the air-tight chamber 3 which is filled, e.g., with air, and which is in contact with the high-heat insert 2 and symmetrical about a central axis, an overheated portion is formed in the central portion of the high-heat insert 2. As a result, the near-the-electrode zone of the arc will be concentrated in the central portion of the effective area of the insert.

The thus formed arc 17 which is struck between the high-heat insert 2 of the electrode assembly and the workpiece 9 is enveloped by a working channel of the nozzle 10 so as to melt said workpiece 9.

Additionally, a welding rod 18 is upon occasion introduced into the zone of the arc 17 which adjoins the workpiece 9, for effecting a welding operation and for necessary surfacing.

Following hereinbelow is the description of an exemplary embodiment of the device including electrode assemblies used for the surface finishing of materials. In this instance, the device comprises the DC source 8 (FIG. 4) whose positive pole is connected to the electrode assembly of the plasmatron A, in which the electrode assembly is made as the cooled holder 1 with the high-heat insert 2, between the interior of the holder and the insert there is located the chamber 3 which is filled with gas. The negative pole of the DC source 8 is connected to the electrode assembly of a plasmatron B in which the electrode assembly is made as the cooled holder 1 with the high-heat insert 2 between the interior of the holder and the insert there is located the chamber 7 which is filled with a solid substance whose coefficient of thermal conductivity is lower than that of the cooled holder 1. The design and operation of said plasmatrons is similar to that of the plasmatron A (FIG. 3) described hereinabove. However, in this instance, an arc 19 burns between the high-heat inserts 2 of the electrode assemblies of the plasmatrons A and B and heats the surface of a workpiece 20 to a certain temperature depending upon the required treatment of the workpiece 20. The temperature of the surface being treated is controlled by varying the distance between the arc and the surface.

What we claim is:

1. An electrode assembly for a plasmatron, comprising: a holder being cooled, a high-heat insert in said holder having a first face which is in contact with a near-the-electrode zone of an arc and a second face in thermal and electrical contact with said cooled holder, a chamber being formed in said holder between said high-heat insert and the interior of said cooled holder extending substantially symmetrical to the axis of said high-heat insert, and a substance filling said chamber whose coefficient of thermal conductivity is lower than that of the material of said cooled holder, the substance filling said chamber being in constant and direct contact with the central portion of said high-heat insert.

2. An electrode assembly as claimed in claim 1, wherein said chamber is air-tight and filled with a gaseous substance selected from the group of gases comprising argon and gas.

3. An electrode assembly as claimed in claim 1, wherein said high-heat insert is a metal selected from Groups IV, V and VI of the Periodic System of elements and an alloy based thereon.

4. An electrode assembly as claimed in claim 1, wherein said chamber is air-tight and filled with a solid substance.

5. An electrode assembly as claimed in claim 4, said solid substance being titanium.

6. An electrode assembly as claimed in claim 4, said solid substance being steel.

7. An electrode assembly as claimed in claim 4, said solid substance being pig iron.

* * * * *